(12) United States Patent
Przybylski

(10) Patent No.: US 9,108,525 B2
(45) Date of Patent: Aug. 18, 2015

(54) TELEMATICS CONTROL OF HIGH ENERGY ELECTRICAL POWER STORAGE DEVICE

(71) Applicant: GENERAL MOTORS LLC, Detroit, MI (US)

(72) Inventor: Matthew G. Przybylski, Fenton, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 98 days.

(21) Appl. No.: 14/096,701

(22) Filed: Dec. 4, 2013

(65) Prior Publication Data

US 2015/0151648 A1 Jun. 4, 2015

(51) Int. Cl.
*B60L 11/00* (2006.01)
*B60L 11/18* (2006.01)
*B60W 30/08* (2012.01)

(52) U.S. Cl.
CPC ............ *B60L 11/1861* (2013.01); *B60W 30/08* (2013.01); *B60W 2710/244* (2013.01)

(58) Field of Classification Search
CPC .............. B60L 11/1861; B60W 30/08; B60W 2710/244; H04K 3/00
USPC .......................................................... 701/22
See application file for complete search history.

(56) References Cited

U.S. PATENT DOCUMENTS

| 2008/0140278 | A1* | 6/2008 | Breed .............................. 701/29 |
| 2010/0250194 | A1* | 9/2010 | Newhouse et al. ........... 702/183 |
| 2012/0157083 | A1* | 6/2012 | Otterson .................... 455/422.1 |
| 2012/0249284 | A1* | 10/2012 | Almquist et al. .............. 340/3.1 |
| 2013/0113277 | A1* | 5/2013 | Kim et al. ...................... 307/9.1 |
| 2014/0046525 | A1* | 2/2014 | Lee et al. ........................ 701/22 |
| 2015/0012174 | A1* | 1/2015 | Kim et al. ...................... 701/36 |

\* cited by examiner

*Primary Examiner* — Richard Camby
(74) *Attorney, Agent, or Firm* — Leydig, Voit & Mayer Ltd.

(57) ABSTRACT

Implementations of the present invention contemplate using the communicative connections between telematics units in vehicles and a telematics service provider (TSP) to facilitate discharging and recharging of high energy electrical power storage devices, e.g. batteries, in vehicles. Specifically, implementations of the present invention contemplate an entity, e.g. a TSP, located remotely from a vehicle, that issues a command to a telematics unit in the vehicle to discharge or recharge an electrical power storage device in the vehicle. In some implementations, the command to discharge the storage device is issued by the TSP or other remote entity in response to a prior transmission sent by the telematics unit in the vehicle to the TSP or other entity. In other implementations, the command to discharge or recharge the storage device issued by the TSP or remote entity is triggered by the determination that a disaster may impact the vehicle.

20 Claims, 5 Drawing Sheets

TELEMATICS CONTROL OF HIGH ENERGY ELECTRICAL POWER STORAGE DEVICE

TECHNOLOGY FIELD

The present disclosure relates generally to vehicular telematics systems and more specifically to the use of telematics units within electric vehicles to control the charging and discharging of high energy electrical power storage devices in such vehicles.

BACKGROUND

There has been a proliferation of electric vehicles in recent years as consumer demand for consumer vehicles has increased. However, electric vehicles and the batteries from which they acquire the power necessary for propulsion present unique risks. Electrical vehicle batteries maintain very high electrical potential differences between the cathode and anode. As a result of these extreme electrical potential differences, electric vehicle batteries can create extremely high electrical current during any discharge caused by a short circuit. Such short circuit events may occur if the vehicle experiences significant damage.

SUMMARY OF THE INVENTION

Implementations of the present invention contemplate using the communicative connections between telematics units in vehicles and a telematics service provider (TSP) to facilitate discharging and recharging of high energy electrical power storage devices, e.g. batteries, in vehicles. The present invention thereby provides means for remotely controlling the discharging and recharging of a high energy electrical power storage device in one or more vehicles. Specifically, implementations of the present invention contemplate an entity, e.g. a TSP, located remotely from a vehicle that issues a command to a telematics unit in the vehicle to trigger a discharge or recharge of an electrical power storage device in the vehicle. In some implementations, the command to discharge or recharge the electrical power storage device is issued by the TSP or other remote entity in response to a prior transmission sent by the telematics unit in the vehicle to the TSP or other entity. In other implementations, the command to discharge or recharge the electrical power storage device issued by the TSP or remote entity is not triggered by any transmission from the telematics unit in the vehicle. In some implementations, the command issued by the TSP for other remote entity may be based on environmental conditions or other conditions known to be occurring in or around the vehicle.

One implementation consists of a method for safely removing stored power from a high energy electrical power storage device in a vehicle implemented with a telematics unit in the vehicle, the method executed while the vehicle is connected to a charging station, the method comprising receiving an instruction to cause the electrical power storage device to attain a low power state through a discharging process, issuing instructions to a charging control module of the vehicle to drain power from the electrical power storage device, receiving, from the charging control module, a confirmation that the electrical power storage device has reached the low power state, transmitting the confirmation to a remotely located service provider, receiving, from the remotely located service provider, instructions to perform a diagnostics test, issuing an instruction to the charging control module to perform the diagnostics test, receiving the results of the diagnostics test, and analyzing the results of the diagnostics test.

An additional implementation consists of a method for safely removing stored power from a high energy electrical power storage device in a vehicle implemented at a server located at a call center of a service provider, the method comprising transmitting, to a telematics unit in the vehicle, an instruction to implement a low power state in the electrical power storage device, receiving a confirmation that the low power state in the electrical power storage device has been achieved, instructing the telematics unit to order a diagnostics test of various systems of the vehicle, and receiving data produced by the diagnostics test of the vehicle.

A further implementation consists of A system for safely removing stored power from a high energy electrical power storage device in a vehicle connected to a charging station, the system comprising a telematics service provider (TSP) configured to issue an instruction to drain power from the electrical power storage device, to receive a confirmation that a low power state has been achieved in the electrical power storage device, and to issue an instruction to perform a diagnostics test, and a telematics unit configured to direct a charging module in the vehicle to drain power from the high energy electrical power storage device, to receive a confirmation that a low power state has been achieved in the electrical power storage device, to transmit the confirmation to the TSP, to receive the instructions to perform a diagnostics test from the TSP, and to direct components of the vehicle to perform the diagnostics test.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
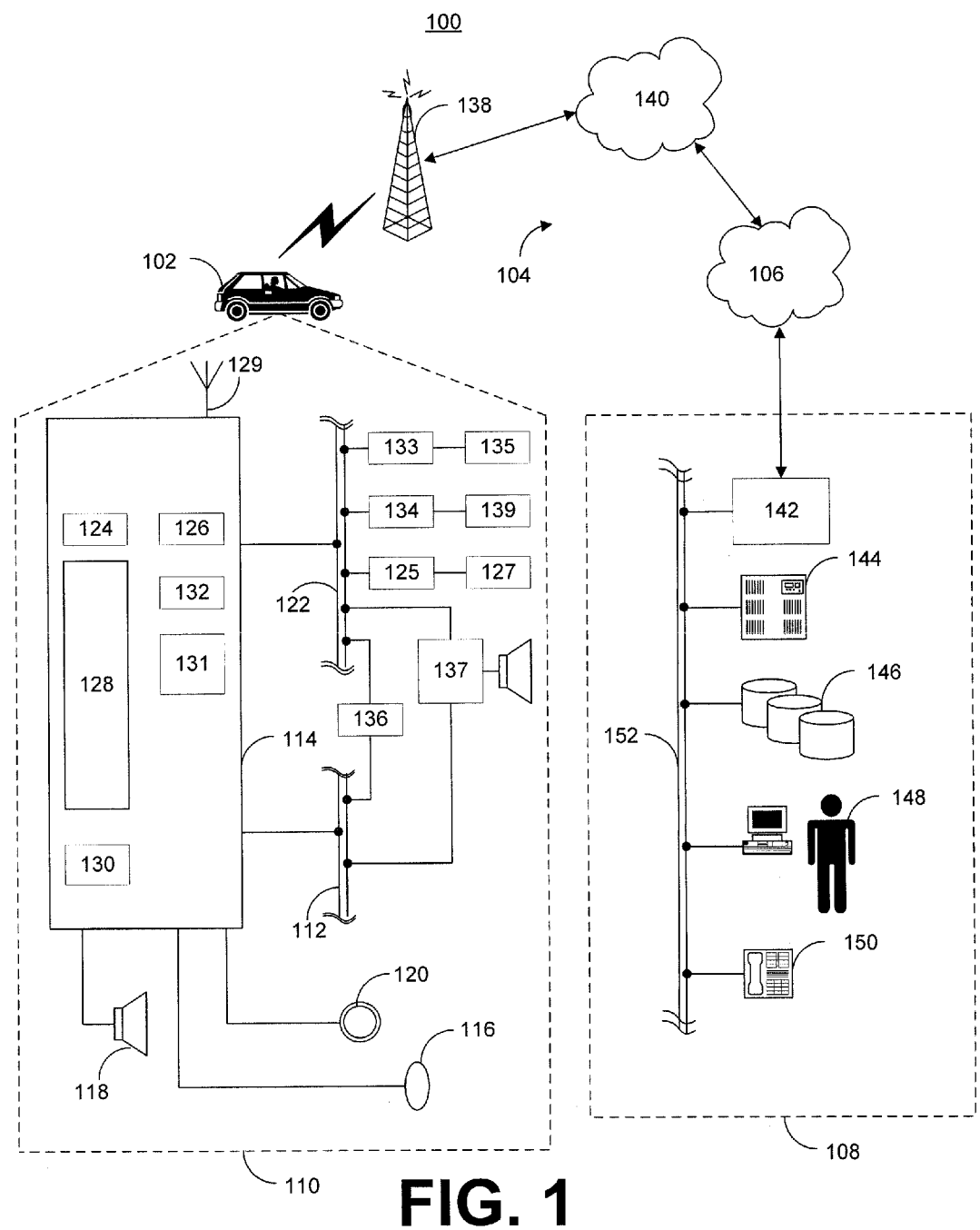
FIG. 1 is a schematic diagram of an operating environment for a mobile vehicle communication system usable in implementations of the described principles.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a call center 108. It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few. Charging and discharging module 125 is operatively connected to the telematics unit 114 through the vehicle bus 122. Charging and discharging module 125 controls the charging and discharging of a high energy electrical power storage device 127. Charging and discharging module 125 may prevent the high energy electrical power storage unit/device 127 from obtaining electrical power from an external vehicle charging device (not pictured) or may cause the high energy electrical power storage device 127 to discharge in order to reach a low-power configuration.

The telematics unit 114 is an onboard device providing a variety of services through its communication with the call center 108, and generally includes an electronic processing device 128, one or more types of electronic memory 130, a cellular chipset/component 124, a wireless modem 126, a dual antenna 129 and a navigation unit containing a GPS chipset/component 132. The GPS chipset/component is capable of determining the location of the vehicle with a high degree of accuracy. For example, the GPS chipset/component could determine that an electric vehicle is located at a particular electric vehicle charging station. In one example, the wireless modem 126 comprises, and is carried out in the form of, a computer program and/or set of software routines executing within the electronic processing device 128. The cellular chipset/component 124 and the wireless modem 126 may be called the network access device (NAD) of the telematics unit 114. The NAD 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol. The short-range wireless unit 131 may also capable of establishing a wifi connection with a WLAN.

The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the GPS component, and a route to a destination is calculated based on the destination address and a current position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a call center 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the cellular chipset/component 124 for voice communications and a wireless modem 126 for data transmission. For example, data pertaining to a forecast of a utility's renewable energy mixture can be transmitted to the telematics unit 114 via the wireless modem 126 or via a wifi connection established through the short-range wireless unit 131.

To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the call center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the call center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained. In some implementations, the crash sensors 135 may also be connected to the telematics module 114 through a hard wired connection.

Vehicle sensors 139, connected to various sensor interface modules 134 are operatively connected to the vehicle bus 122. Vehicle sensors 139 include sensors with capabilities that include but that are not limited to determining a battery's state of charge (e.g. as a percentage of the total charge capacity), the charging status of a battery (i.e. whether the battery is currently being charged), and the current rate at which the battery is being charged (e.g. as a rate of change of the percentage of capacity charged per unit time). The vehicle sensors 139 can also include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The call Center (OCC) 108 is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records, subscriber behavioral patterns, or any other pertinent subscriber information. Although the illustrated example has been described as it would be used in conjunction with a manned call center, it will be appreciated that the call center 108 can be any central or remote facility, manned or unmanned, mobile or fixed, to or from which it is desirable to exchange voice and data.

A portion of the databases 146 stores information pertaining to the identity of the telematics unit 114. For example, the databases 146 may store, for each vehicle, an integrated circuit card identifier (ICCID) corresponding to the subscriber identity modules (SIMs) of the vehicle's telematics unit, an international mobile equipment identity (IMEI) corresponding to network access devices (NADs) integrated into the vehicle's telematics units, a mobile identification number (MIN), an electronic serial numbers (ESN), a mobile equipment identifier (MEID), an international mobile subscriber identity (IMSI) associated with the SIM cards of the vehicle's telematics unit, a mobile device number (MDN), a mobile station international subscriber directory number (MSISDN), a service set identifier (SSID), a media access control (MAC) address, and an internet protocol (IP) address associated with the vehicle's telematics unit. Additional information pertaining to a subscriber affiliated with a particular telematics unit 114 may also be stored in the databases 146. For example, billing information associated with the subscriber may be stored in the databases 146. The preceding examples of information that can be stored at databases 146 is not exhaustive, and additional fields of data may also be stored at databases 146.

In general terms, not intended to limit the claims, the example environment depicted by FIG. 1 may be used by systems and methods that use the communicative connections between telematics units in vehicles and a telematics service provider (TSP) to facilitate discharging and recharging of high energy electrical power storage devices, e.g. batteries, in vehicles. The present invention thereby provides means for remotely controlling the discharging and recharging of a high energy electrical power storage device in one or more vehicles. Specifically, implementations of the present invention contemplate an entity, e.g. a TSP, located remotely from a vehicle that issues a command to a telematics unit in the vehicle to commence discharging or recharging an electrical power storage device in the vehicle. In some implementations, the command to discharge or recharge the electrical power storage device is issued by the TSP or other remote entity in response to a prior transmission sent by the telematics unit in the vehicle to the TSP or other entity. For example, in some implementations a telematics unit in a vehicle may transmit a notification to the TSP or other entity that the vehicle has been involved in a crash or collision. In other implementations, the command to discharge or recharge the electrical power storage device issued by the TSP or remote entity is not triggered by any transmission from the telematics unit in the vehicle. For example, the TSP or remote entity may issue the command to discharge or recharge the electrical vehicle based on an indication that a natural disaster may or may not impact the area in which a vehicle is located.

In an example implementation, the TSP issues a command to all vehicles located in a geographic area threatened by a natural disaster having an electrical power storage device to discharge the electrical power storage device. Once the threat posed by the natural disaster has passed, the TSP requests diagnostics information from vehicles to whom commands to discharge the electrical power storage device were issued. Once the TSP receives the diagnostics information, the TSP determines which vehicles were able to run diagnostics tests with no faults after the threat posed by the natural disaster passed and which vehicles received faults when diagnostics tests were run after the threat posed by the natural disaster passed. Thereafter, the TSP issues commands to the vehicles that did not receive faults to enable recharging and issues commands to the vehicles that did receive faults to prevent charging.

Figure 2:
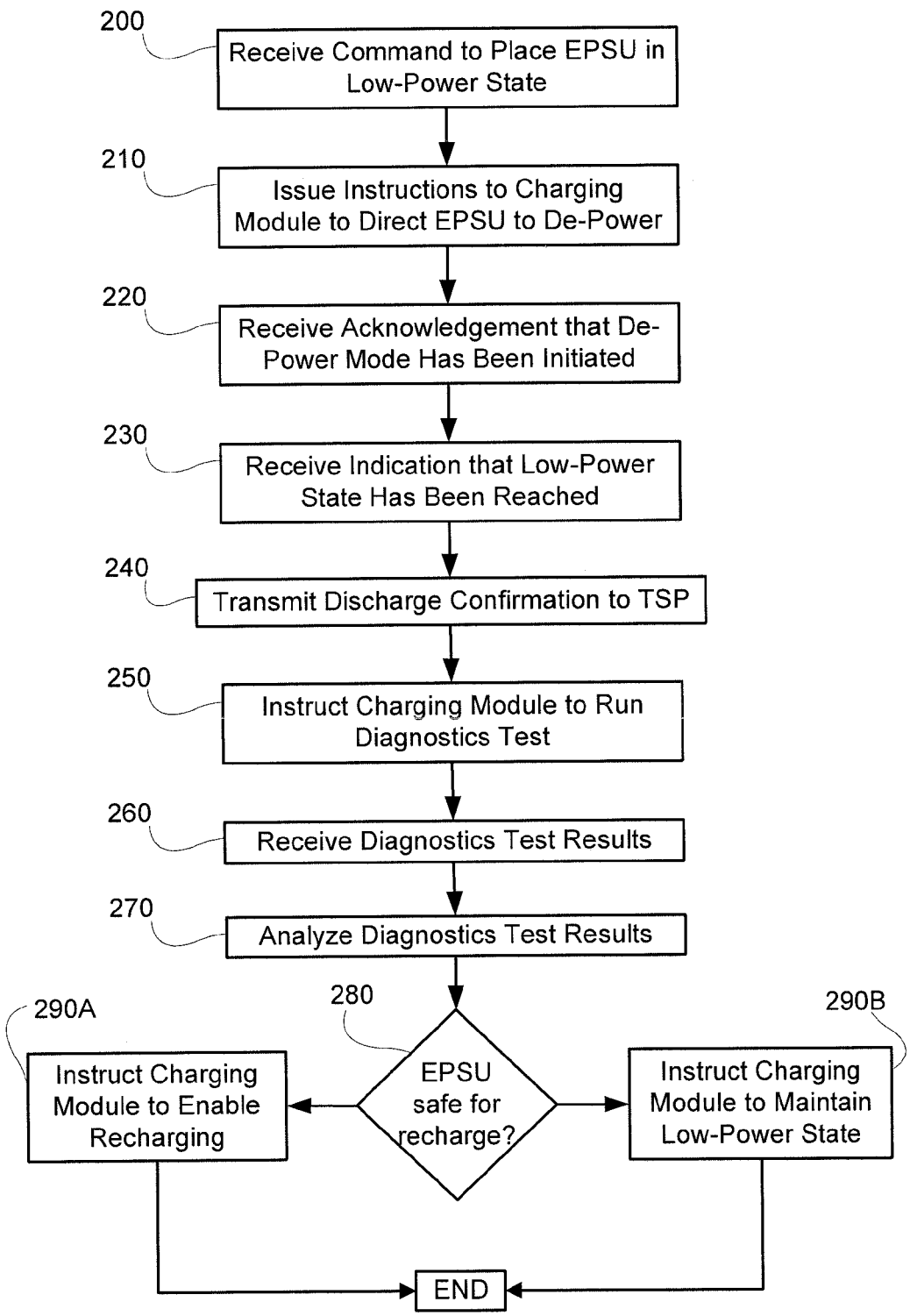
FIG. 2 is a flow chart summarizing an example process executed by a telematics unit in a vehicle for discharging and recharging an electrical power storage device in the vehicle.

FIG. 2 is a flow chart summarizing an example process executed by a telematics unit in a vehicle for discharging and recharging an electrical power storage device in the vehicle. At step 200, the telematics unit 114 receives a command to place electrical power storage unit 127 into a discharged state. Specifically, the command instructs the telematics unit 114 to facilitate the secure discharge of the electrical potential built up on the electrodes of the electrical power storage unit 127. The command received by the telematics unit 114 is transmitted by a telematics service provider (TSP) or by some other remotely located entity. In some implementations, the command is transmitted to the telematics unit 114 in response to a prior communication transmitted by the telematics unit 114. For example, in some implementations the command received by the telematics unit 114 may be transmitted in response to a prior communication transmitted by the telematics unit 114 indicating that the vehicle 102 has been involved in a crash. The telematics unit 114 might transmit such a communication in response to the vehicle crash sensors 133 determining that the vehicle has been involved in a crash. In some such implementations, the telematics unit may determine, base on information provided by the vehicle crash sensors 133 that the crash was not severe enough to warrant transmitting a crash notification communication to a remotely located entity such as a TSP. In other implementations, the command received at 200 by the telematics unit 114 may not be responsive to any transmission of information initiated by the telematics unit 114 but instead may be triggered by an event unrelated to the conditions detected at the vehicle 102. For example, a disaster response organization could broadcast a command to telematics units of vehicles located in a disaster area to place electrical power storage units into low power states as a result of determining that a disaster has occurred or is about to occur.

At step 210, the telematics unit 114 issues instructions to charging and discharging module 125 to initiate a discharge mode in the electrical power storage unit 127 that will cause the electrical power storage unit 127 to discharge its stored power. The instructions issued by the telematics unit 114 may be contingent upon the detection of some condition or set of conditions by the charging and discharging module 125. For example, the instructions may be conditional upon determining that the electrical power storage unit 127 has sustained some level of damage and/or has not sustained too severe a damage level to be able to effectively transition to a low power state. The conditionality of the instructions issued by the telematics unit 114 can ensure that the dissipation of electric charge built of in the electrodes of the electrical power storage unit 127 will not create a risk of injury or property damage that exceeds the risk posed by maintaining the electrical power storage unit 127 in a fully charged state.

At step 220, the telematics unit 114 receives an acknowledgement from the charging and discharging module 125 that a discharge mode has been initiated in the electrical power storage unit 127. At step 230, receipt of the acknowledgement that the discharge mode has been initiated by the charging and discharging module triggers the telematics unit 114 to command the vehicle to display a warning message. The warning message may be displayed or audibly played at . . . or a combination thereof. In some implementations, the warning message indicates to a user the reason for the initiation of the discharge mode in the electrical power storage unit 127. Some implementations also provide the user with the opportunity to override the initiation of the discharge mode. However, in some instances, for example if the charging and de-charging module 125 has identified a condition in the electrical power storage unit 127 that poses a considerable risk of injury to an operator of the vehicle or to bystanders in close proximity to the vehicle, the initiation of the discharge mode may not be overridden by the user of the vehicle 102. In such implementations, the telematics unit 114 may also receive an indication at step 220 that the initiation of the discharge mode may not be overridden.

At step 230, the telematics unit 114 receives an indication from the charging and discharging module 125 that the discharge of the electrical power storage unit 127 has been completed and that the electrical power storage unit 127 has reached a low power state. At step 240, the telematics unit may transmit information to the TSP or to another remotely located entity confirming that discharge of the electrical power storage unit 127 has been completed. In some implementations, a request for further instructions may also be transmitted at step 240 by the telematics unit 114 to the TSP or other remotely located entity. The entity to which the telematics unit 114 transmits the confirmation may or may not be the same entity from which the telematics unit 114 received the command at step 200 to place the energy storage unit into a low power state. In some implementations, the telematics unit 114 may transmit a confirmation that the electrical power storage unit 127 has reached a low power state to more than one entity.

At step 250, the telematics unit 114 instructs the charging and discharging module 125 to perform a diagnostic test of the electrical power storage unit 127. In alternative implementations, the charging and discharging module 125 may execute diagnostics test without being instructed to run such test by other modules. For example, the charging and discharging module 125 may execute diagnostics test periodically or contingently execute diagnostics tests upon detecting one of a number of conditions. The telematics unit 114 may issue the instructions to the charging and discharging module in response to receiving instructions from the TSP or from another remotely located entity, e.g. a natural disaster response organization. At step 260, the telematics unit 114 receives the results of the diagnostics test of the electrical power storage unit 127. At step 270, the results of the diagnostics test are analyzed. In some implementations, the analysis of the diagnostics test results are performed by the telematics unit 114. In other implementations, the telematics unit 114 transmits the results of the diagnostics test to a remotely located service provider, e.g. the TSP, along with instructions for analyzing the diagnostics test results. In such implementations, the results of the diagnostics test are analyzed by a remotely located service provider such as the TSP.

At step 280, it is determined whether or not the electrical power storage unit 127 is ready to be safely re-charged to full capacity. The determination made at step 280 may be based on the results of the analysis of the diagnostics test. In some implementations, the determination at step 280 is made by the telematics unit 114. In other implementations, the determination at step 280 is made by the TSP or by another remotely located service provider. If the electrical power storage unit 127 is determined to be ready to be safely re-charged to full capacity, the process proceeds to step 290A at which a signal is sent to the charging and discharging module 125 instructing the module to enable the electrical power storage unit 127 to be recharged. On the other hand, if the electrical power storage unit 127 is determined to be unready to be safely re-charged, the process proceeds to step 290B where the charging and discharging module is instructed to maintain the electrical power storage unit 127 in a low power configuration.

Figure 3:
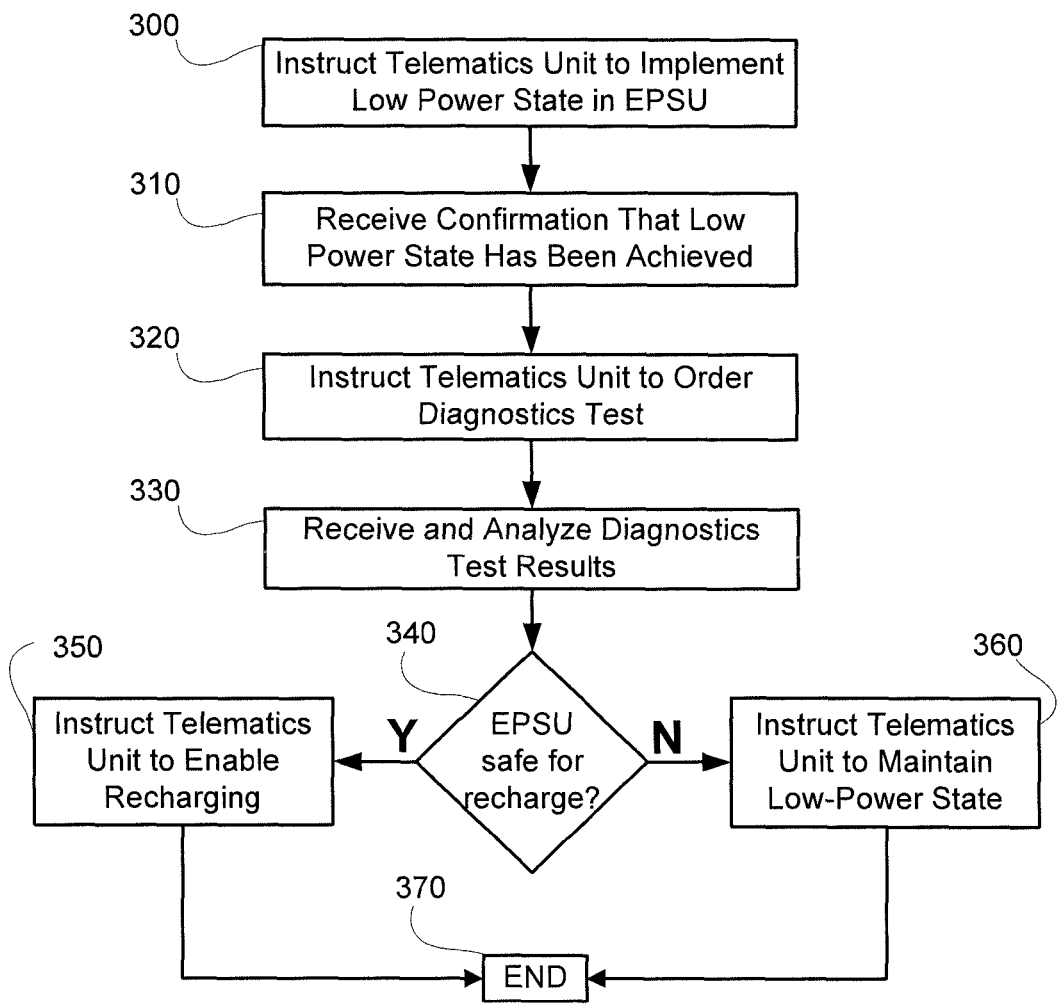
FIG. 3 is a flow chart summarizing an example process executed by a telematics service provider for discharging and recharging an electrical power storage device in a vehicle equipped with a telematics unit.

FIG. 3 is a flow chart summarizing an example process executed by a telematics service provider (TSP) for discharging and recharging an electrical power storage device in a vehicle equipped with a telematics unit. At step 300, the TSP issues a command to the telematics unit 114 to cause the charging and discharging module 125 to place the electrical power storage unit 127 into a low power state through the execution of a discharge process. The discharge process is performed through the utilization of a mechanism that allows the electrical power storage unit 127 to safely discharge the electrical charge built up on its electrodes in order to reach a low power state. Upon reaching the low power state, the magnitude of the damage caused by a potential short circuit across the electrodes of the electrical power storage device 127 will be minimized. Furthermore, the TSP may also issue instructions to the telematics unit 114 to transmit a confirmation to the TSP when the electrical power storage device 127 has successfully reached a low power state.

At step 310, the TSP receives a continuation from the telematics unit 114 that the charging and discharging module 125 has effectively caused the electrical power storage unit 127 to reach a low power state. Thereafter, at step 320, the TSP issues instructions to the telematics unit 114 to cause the charging and discharging module 125 to perform a diagnostics test designed to determine whether or not the vehicle is in a condition in which the electrical power storage unit 127 can be safely recharged. In some implementations, the instructions issued by the TSP at step 320 directs the telematics unit to issue instructions to the charging and discharging module 125 to run tests of the electrical power storage unit 127 and to provide data obtained from the tests. The instructions issued by the TSP at step 320 may also direct the telematics unit 114 to obtain data from various other vehicle sensors 139 through vehicle sensor interface modules 134.

At step 330, the TSP receives the results of the diagnostics tests and analyzes the results. In some implementations, the data received and analyzed by the TSP include only data pertaining to the electrical power storage unit 127. In other implementations, the data received and analyzed by the TSP includes data pertaining to the electrical power storage unit 127 and further includes data pertaining to the vehicular systems and elements monitored by vehicle sensors 139. At step 340, the TSP determines whether or not the electrical power storage unit 127 can be safely re-charged to a high power state based on the data perceived at step 330. If the TSP determines that the electrical power storage unit 127 can safely be re-charged to a high power state, then at step 350 the TSP issues a command to the telematics unit 114 to direct the charging and discharging module 125 to allow recharging of the electrical power storage unit 127. However, if the TSP determines that the electrical power storage unit 127 cannot safely be re-charged to a high power state, then at step 360 the TSP issues a command to the telematics unit 114 to direct the charging and discharging module 125 to maintain the electrical power storage unit 127 in a low power state. At step 370 the process ends.

Figure 4:
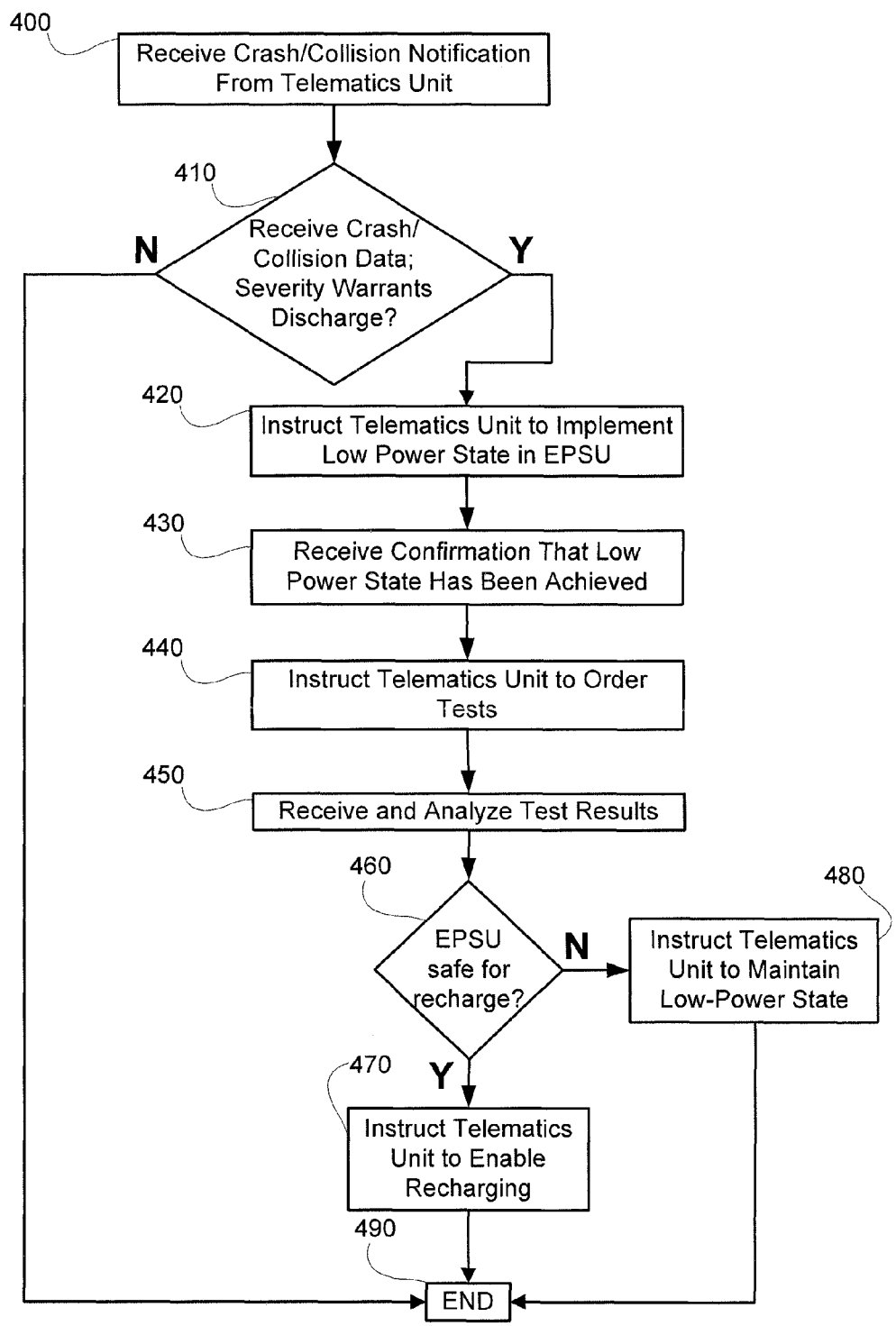
FIG. 4 is a flow chart summarizing an example process executed by a telematics service provider for discharging and recharging an electrical power storage device in a vehicle equipped with a telematics unit in response to the determination that the vehicle has been involved in a crash.

FIG. 4 is a flow chart summarizing an example process executed by a telematics service provider (TSP) for discharging and recharging an electrical power storage device in a vehicle equipped with a telematics unit in response to the determination that the vehicle has been involved in a crash. At step 400, the TSP receives a notification from the telematics unit 114 of vehicle 102 that has been involved in a crash. The telematics unit 114 may transmit such a notification to the TSP as a result of receiving an indication that the vehicle 102 has been involved in a crash from the vehicle crash and/or collision detection sensor interface 133. The vehicle crash sensors 135 provide information to the telematics unit 114 via the crash and/or collision detection sensor interface 133 regarding the severity of a vehicle collision, such as the angle of impact and the amount of force sustained. In addition, vehicle sensors 139 may transmit additional data ascertained from other vehicular components and systems. At step 410, the information provided to the telematics unit 114 by the vehicle crash sensors 135 is transmitted to the TSP, and the TSP determines whether or not the severity of the crash warrants the placement of the electrical power storage device 127 into a low power state.

If it is determined that the severity of the crash is insufficient to cause the electrical power storage device 127 to be placed into a low power state, then the process proceeds to step 490 where the process ends. However, if the TSP determines that the severity of the crash is sufficient to warrant placing the electrical power storage device 127 into a low power state, the process proceeds to step 420 where the TSP issues a command to the telematics unit 114 to cause the charging and discharging module 125 to place the electrical power storage unit 127 into a low power state through the execution of a discharge process. The level of crash severity deemed sufficient to warrant placing the electrical power storage device 127 into a low power state may be determined based on the probability that damage sustained during the crash will cause a short between electrodes of the high power electrical power storage unit 127. In other implementations, the level of crash severity deemed sufficient to compel the discharge of the electrical power storage unit 127 is based upon a risk weighted expectation value of the damage likely to be sustained if the electrical power storage unit 127 is not discharged. In other implementations, the sufficient level of crash severity is based upon a comparison of a risk weighted expectation value of additional damage likely to be sustained if the electrical power storage unit 127 is not discharged compared to a risk weighted expectation value of additional damage likely to be sustained if the electrical power storage unit 127 is discharged. The risk weighted expectation values of additional damage likely to be sustained are computed by the TSP using data received from the telematics unit 114 at step 410. Furthermore, the TSP may also issue instructions to the telematics unit 114 to transmit a confirmation to the TSP when the electrical power storage device 127 has successfully reached a low power state.

At step 430, the TSP receives a confirmation from the telematics unit 114 that the charging and discharging module 125 has effectively caused the electrical power storage unit 127 to reach a low power state. Thereafter, at step 440, the TSP issues instructions to the telematics unit 114 to cause the charging and discharging module 125 to perform a diagnostics test designed to determine whether or not the vehicle is in a condition in which the electrical power storage unit 127 can be safely recharged. In some implementations, the instructions issued by the TSP at step 440 directs the telematics unit to issue instructions to the charging and discharging module 125 to run tests of the electrical power storage unit 127 and to provide data obtained from the tests. The instructions issued by the TSP at step 440 may also direct the telematics unit 114 to obtain data from various other vehicle sensors 139 through vehicle sensor interface modules 134.

At step 450, the TSP receives the results of the diagnostics tests and analyzes the results. In some implementations, the data received and analyzed by the TSP include only data pertaining to the electrical power storage unit 127. In other implementations, the data received and analyzed by the TSP includes data pertaining to the electrical power storage unit 127 and further includes data pertaining to the vehicular systems and elements monitored by vehicle sensors 139. At step 460, the TSP determines whether or not the electrical power storage unit 127 can be safely re-charged to a high power state based on the data received at step 450. If the TSP determines that the electrical power storage unit 127 can safely be re-charged to a high power state, then at step 470 the TSP issues a command to the telematics unit 114 to direct the charging and discharging module 125 to allow recharging of the electrical power storage unit 127. However, if the TSP determines that the electrical power storage unit 127 cannot safely be re-charged to a high power state, then at step 480 the TSP issues a command to the telematics unit 114 to direct the charging and discharging module 125 to maintain the electrical power storage unit 127 in a low power state. At step 490 the process ends.

Figure 5:
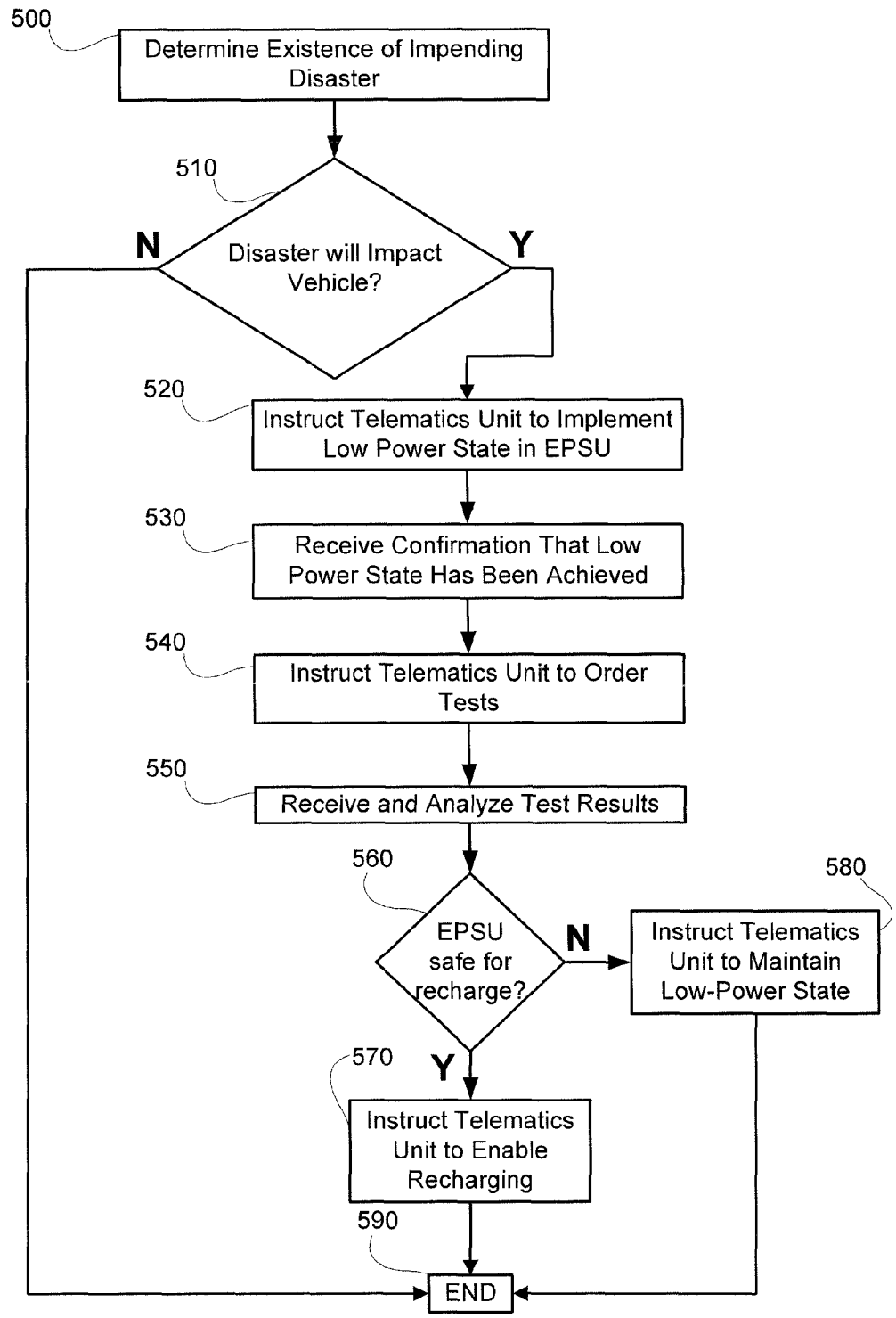
FIG. 5 is a flow chart summarizing an example process executed by a telematics service provider for discharging and recharging an electrical power storage device in a vehicle equipped with a telematics unit in response to the determination that an impending disaster exists or that a disaster has begun.

FIG. 5 is a flow chart summarizing an example process executed by a telematics service provider (TSP) for discharging and recharging an electrical power storage device in a vehicle equipped with a telematics unit in response to the determination that an impending disaster exists or that a disaster has begun. At step 500, the TSP determines that an impending disaster has begun or will begin at some point in the near future. For example, the TSP may receive a notification from the national weather service that tornados are expected to cause damage to a particular geographic area or that a hurricane will cause flooding with damage to automobiles located in a geographic area. At step 510, the TSP determines whether or not the natural disaster will impact the vehicle 102 based upon the location of the vehicle 102 and other information pertaining to the vehicle 102. The location of the vehicle 102 may be ascertained by the TSP at step 510 as a result of the transmission of a request sent from the TSP to the vehicle and a response issued by the vehicle 102 and sent to the TSP. The response issued by the vehicle 102 may be based upon information generated by the GPS chipset/component 132. Additional information pertaining to the location of vehicle 102 may be obtained from one of databases 146. For example, behavioral patterns of the vehicle may indicate that the vehicle is very likely to be moved prior to the disaster reaching the location where the vehicle is currently located.

If it is determined that the disaster is not sufficiently likely to cause damage to the electrical power storage device 127 or that the damage likely to be caused by the disaster is insufficient to warrant placing the electrical power storage device 127 into a low power mode, then the process proceeds to step 590 where the process ends. However, if the TSP determines that the severity of the damage likely to be caused by the disaster is sufficient to warrant placing the electrical power storage device 127 into a low power state, the process proceeds to step 520 where the TSP issues a command to the telematics unit 114 to cause the charging and discharging module 125 to place the electrical power storage unit 127 into a low power state through the execution of a discharge process. The level of expected damage caused by the disaster deemed sufficient to warrant placing the electrical power storage device 127 into a low power state may be determined based on the probability that the disaster will affect the vehicle 102 and the expected magnitude of the damage likely to be sustained if the disaster affects the vehicle 102. In some implementations, the level of expected damage caused by the disaster deemed sufficient to warrant placing the electrical power storage device 127 into a low power state may also assess the reduction in expected damage if the electrical power storage unit is discharged prior to the point in time at which the disaster will affect the vehicle 102. Furthermore, the TSP may also issue instructions to the telematics unit 114 to transmit a confirmation to the TSP when the electrical power storage device 127 has successfully reached a low power state.

At step 530, the TSP receives a confirmation from the telematics unit 114 that the charging and discharging module 125 has effectively caused the electrical power storage unit 127 to reach a low power state. Thereafter, at step 540, the TSP determines that the threat posed to the vehicle by the disaster has passed and issues instructions to the telematics unit 114 to cause the charging and discharging module 125 to perform a diagnostics test designed to determine whether or not the vehicle is in a condition in which the electrical power storage unit 127 can be safely recharged. In some implementations, the instructions issued by the TSP at step 540 direct the telematics unit to issue instructions to the charging and discharging module 125 to run tests of the electrical power storage unit 127 and to provide data obtained from the tests. The instructions issued by the TSP at step 540 may also direct the telematics unit 114 to obtain data from various other vehicle sensors 139 through vehicle sensor interface modules 134.

At step 550, the TSP receives the results of the diagnostics tests and analyzes the results. In some implementations, the data received and analyzed by the TSP include only data pertaining to the electrical power storage unit 127. In other implementations, the data received and analyzed by the TSP includes data pertaining to the electrical power storage unit 127 and further includes data pertaining to the vehicular systems and elements monitored by vehicle sensors 139. At step 560, the TSP determines whether or not the electrical power storage unit 127 can be safely re-charged to a high power state based on the data received at step 550. If the TSP determines that the electrical power storage unit 127 can safely be re-charged to a high power state, then at step 570 the TSP issues a command to the telematics unit 114 to direct the charging and discharging module 125 to allow recharging of the electrical power storage unit 127. However, if the TSP determines that the electrical power storage unit 127 cannot safely be re-charged to a high power state, then at step 580 the TSP issues a command to the telematics unit 114 to direct the charging and discharging module 125 to maintain the electrical power storage unit 127 in a low power state. At step 590 the process ends.

It will be appreciated by those of skill in the art that the information exchanged between the user, the call center, and the recharging station may vary in content. For example, the call center may have the authority to schedule a recharging event on behalf of the user without allowing the user to select amongst appropriate recharging stations. In such an embodiment, the call center may select the recharging station that is the best match based upon the criteria selected by the user.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit may be carried out according to stored recommendations or applications installed on the telematics unit, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for safely removing stored power from a high energy electrical power storage device in a vehicle implemented at a telematics unit in the vehicle, the method comprising:
   receiving an instruction to cause the electrical power storage device to attain a low power state through a discharging process;
   issuing instructions to a charging control module of the vehicle to drain power from the electrical power storage device;
   receiving, from the charging control module, a confirmation that the electrical power storage device has reached the low power state;
   transmitting the confirmation to a remotely located service provider;
   receiving, from the remotely located service provider, instructions to obtain the results of a diagnostics test;
   issuing an instruction to the charging control module to perform the diagnostics test;
   receiving the results of the diagnostics test; and
   analyzing the results of the diagnostics test.

2. The method of claim 1, further comprising:
   determining that the analysis of the diagnostics test indicates that the electrical power storage device can be safely recharged, and
   instructing the charging control module to enable the electrical power storage device to recharge.

3. The method of claim 1, wherein the receiving an instruction to cause the electrical power storage device to attain a low power state through a discharging process is in response to a determination by a remotely located service provider that an impending disaster may impact the vehicle.

4. The method of claim 3, wherein the receiving instructions to perform a diagnostics test is in response to a determination by the remotely located service provider that the threat posed by the impending disaster is no longer present.

5. The method of claim 1, wherein the receiving an instruction to cause the electrical power storage device to attain a low power state through a discharging process is in response to a determination by the telematics unit that the vehicle has been involved in a crash or collision and a transmission by the telematics unit of information pertaining to the crash or collision to a remotely located service provider.

6. The method of claim 1, further comprising:
   issuing an instruction to vehicle components to display a warning notification both during the discharging process and while the electrical power storage device is in a low-power mode.

7. A method for safely removing stored power from a high energy electrical power storage device in a vehicle implemented at a server located at a call center of a service provider, the method comprising:
   transmitting, to a telematics unit in the vehicle, an instruction to implement a low power state in the electrical power storage device;
   receiving a confirmation that the low power state in the electrical power storage device has been achieved;
   instructing the telematics unit to order a diagnostics test of various systems of the vehicle; and
   receiving data produced by the diagnostics test of the vehicle.

8. The method of claim 7, further comprising:
   analyzing the data produced by the diagnostics test of the vehicle;
   determining that the electrical power storage device of the vehicle can safely be recharged; and transmitting, to the telematics unit in the vehicle, an instruction to enable recharging of the electrical power storage device.

9. The method of claim 7; wherein the transmitting, to a telematics unit in the vehicle, an instruction to implement a low power state in the electrical power storage device is in response to:
receiving, from the telematics unit in the vehicle, data indicating that the vehicle has been involved in a collision; and
determining, from the data, that the severity of the collision is sufficient to justify draining power from the electrical power storage device.

10. The method of claim 9, wherein the severity of the collision is sufficient to justify draining power from the electrical power storage device if a risk weighted expectation value of the damage likely to be sustained if the electrical power storage unit is not discharged exceeds a threshold value.

11. The method of claim 7, wherein the transmitting, to a telematics unit in the vehicle, an instruction to implement a low power state in the electrical power storage device is in response to:
determining that a disaster poses a risk to the vehicle.

12. The method of claim 11, wherein determining that a disaster poses a risk to the vehicle comprises determining that the vehicle is in a geographic area that the disaster is likely to impact.

13. The method of claim 11, wherein determining that a disaster poses a risk to the vehicle comprises determining that the expectation value of the damage likely to be caused by the disaster exceeds a threshold value.

14. The method of claim 13, wherein the expectation value of the damage likely to be caused by the disaster is determined from the probability that the disaster will affect the vehicle and the expected magnitude of the damage likely to be sustained if the disaster affects the vehicle.

15. A system for safely removing stored power from a high energy electrical power storage device in a vehicle connected to a charging station, the system comprising:
a telematics service provider (TSP) configured to issue an instruction to drain power from the electrical power storage device, to receive a confirmation that a low power state has been achieved in the electrical power storage device, and to issue an instruction to perform a diagnostics test; and
a telematics unit configured to direct a charging module in the vehicle to drain power from the high energy electrical power storage device, to receive a confirmation that a low power state has been achieved in the electrical power storage device, to transmit the confirmation to the TSP, to receive the instructions to perform a diagnostics test from the TSP, and to direct components of the vehicle to perform the diagnostics test.

16. The system of claim 15, wherein the telematics unit is further configured to determine that the vehicle has been involved in a collision and to transmit information pertaining to the collision to the TSP.

17. The system of claim 16, wherein the TSP is further configured to determine that the severity of the collision is sufficient to warrant draining power from the electrical power storage unit.

18. The system of claim 15, wherein the TSP is further configured to determine that a disaster is likely to impact the vehicle.

19. The system of claim 15, wherein the TSP is further configured to receive results of the diagnostics test, analyze the results, and determine that an instruction to allow recharging of the electrical power storage device should be issued.

20. The system of claim 15, wherein the telematics unit is further configured to receive results of the diagnostics test, analyze the results, and determine that an instruction to allow recharging of the electrical power storage device should be issued.

* * * * *